United States Patent [19]

Rottmaier et al.

[11] 4,409,347

[45] Oct. 11, 1983

[54] FLAME-PROOF POLYAMIDE MOULDING COMPOSITIONS

[75] Inventors: Ludwig Rottmaier, Odenthal; Rudolf Merten, Leverkusen; Milan J. Tima, Cologne; Dietrich Michael, Krefeld, all of Fed. Rep. of Germany

[73] Assignee: Bayer Aktiengesellschaft, Leverkusen, Fed. Rep. of Germany

[21] Appl. No.: 355,602

[22] Filed: Mar. 8, 1982

[30] Foreign Application Priority Data

Mar. 12, 1981 [DE] Fed. Rep. of Germany ....... 3109479

[51] Int. Cl.³ .............................................. C08K 5/34
[52] U.S. Cl. .................................... 524/91; 524/100; 524/399; 524/401
[58] Field of Search .................................... 524/91, 93

[56] References Cited

U.S. PATENT DOCUMENTS

| | | | |
|---|---|---|---|
| 3,008,936 | 11/1961 | Kamlet | 524/91 |
| 3,383,353 | 5/1968 | Goto | 524/93 |
| 3,888,822 | 6/1975 | Gilleo et al. | 524/93 |
| 4,310,450 | 1/1982 | Wang et al. | 524/91 |
| 4,315,849 | 2/1982 | Buxbaum | 524/93 |

*Primary Examiner*—John Kight, III
*Assistant Examiner*—R. A. White
*Attorney, Agent, or Firm*—Connolly and Hutz

[57] ABSTRACT

Self-extinguishing flame resistant polyamide moulding compositions containing from 0.1 to 20% by weight of at least one glycoluril and/or reaction product of glycoluril as a flame-proofing agent.

9 Claims, No Drawings

FLAME-PROOF POLYAMIDE MOULDING COMPOSITIONS

Various processes have already been proposed to render thermoplastic plastics materials flame-resistant and fire-retardant. The most frequently used process comprises admixing with the resin a flame-resisting and fire-retardant agent. Red phosphorus and compounds containing halogen and nitrogen are well known fire-retardant agents.

Pulverised red phosphorus or halogen compounds together with synergistically active metal compounds are presently used on a commercial scale as fireproofing agents for polyamide moulding compositions. These fireproofing agents and the use thereof are described, for example, in U.S. Pat. No. 3,418,267, German Auslegeschrift Nos. 1.694,494 and 1,931,387 and in German Offenlegungsschrift No. 2,544,219.

Halogen compounds have the disadvantage of reducing the creep resistance of the polyamide moulding compositions and, in the event of combustion, of releasing hydrogen halide which may cause considerable corrosion in the surroundings of the fire. Moulding compositions containing halogen compounds also release hydrogen halide to a slight extent at elevated temperatures required in processing machines and the hydrogen halide may damage the machines. Moreover, the synergistically active metal compounds, such as, for example, antimony trioxide are toxic.

Pulverulent red phosphorus has to be handled carefully, because it can lead to dust explosions in the presence of air upon contact with hot metal surfaces.

A further disadvantage can be the ready formation of toxic phosphorus-hydrogen compounds which can take place at the elevated processing temperatures of the moulding compositions by a reaction of the phosphorus with polyamides. Numerous additional procedural steps have been recommended, as described, for example, in German Auslegeschrift Nos. 2,308,104; 2,625,673 and 2,625,691 in order to improve this development as far as possible.

Finally, the inherent red colour of phosphorus impairs the adjustment of light colour shades in the moulding compositions. The large quantity of white pigments which is required to conceal the red colour of the phosphorus entails a deterioration of the mechanical properties.

Furthermore, it has been proposed to add melamine (German Auslegeschrift No. 1,694,254), cyanuric acid (U.S. Pat. No. 3,980,618) and melamine and cyanuric acid (U.S. Pat. No. 4,001,177) in order to render polyamide moulding compositions flame-proof.

By adding melamine, a satisfactory flame-proofing is achieved, but the melamine may sublime under the moulding conditions and may be deposited on the mould. This phenomenon is termed "flattening out". In this event, the moulding becomes spotted or is detached, which is undesirable.

It is for this reason that the products do not always have a satisfactory appearance.

By adding cyanuric acid, the mechanical properties of the moulding are impaired even with small quantities of flameproofing agent and considerable bloom phenomena are observed. When adding cyanuric acid and melamine, it is necessary to add at least 10 parts by weight to 100 parts by weight of polyamide resin in order to achieve a satisfactory flameproofing. In this case as well, the "flattening out" and "blooming" phenomena are considerable.

Surprisingly by using the flameproofing agent according to the present invention, it is possible to provide a polyamide resin composition which shows a satisfactory flame resistance and is suitable in particular for the production of mouldings having light colours, because all the components are practically colourless or white.

Thus, the present invention provides self-extinguishing, flame proof, thermoplastic polyamide moulding compositions which optionally contain up to 60% by weight, based on the total moulding compositions, of reinforcing materials and/or fillers and optionally other conventional aids and/or additives, and which are characterised in that they contain from 0.1 to 20% by weight, based on the total moulding compositions, of glycolurils and/or reaction products of glycolurils as flameproofing agents.

The following may be used as thermoplastic polyamide resins: polyamides which are obtained by the polymerisation of a lactam having at least five ring members or of a corresponding ε-aminocarboxylic acid, for example ε-caprolactam, aminocaproic acid, enatholactam, 7-aminohexanoic acid, 9-aminononanoic acid, 11-aminoundecanoic acid, α-pyrrolidone and piperidone, also polyamide resins which are obtained by the polycondensation of aliphatic diamines such as hexamethylenediamine, 2,2,4- and 2,4,4-trimethylhexamethylenediamine, isophoronediamine, 1,3- and 1,4-bisaminocyclohexane, bisamino-cyclohexyl-alkanes, xylylenediamine and aliphatic or aromatic dicarboxylic acids such as adipic acid, sebacic acid, azelaic acid, dodecane dicarboxylic acid, glutaric acid, cyclohexanedicarboxylic acid, isophthalic acid and terephthalic acid.

Polyamides which are prepared from the above-mentioned aliphatic dicarboxylic acid and aromatic diamines, for example, 1,3- and 1,4-diaminobenzene, and polyamide mixtures and copolyamides of all the components mentioned, so far as aliphatic or partly-aliphatic polyamides are produced can be rendered flame-proofed according to the invention. Polyamide-6 and polyamide-6,6 are particularly preferred.

The polyamide resin may also contain other resins, e.g. polyesters, polyolefins, polytetrafluoroethylene, ABS, AS or ethylene-vinyl acetate copolymers in quantities as high as 50% by weight, based on polyamides.

Glycolurils of the following general formula (I) are preferably used as flameproofing agents:

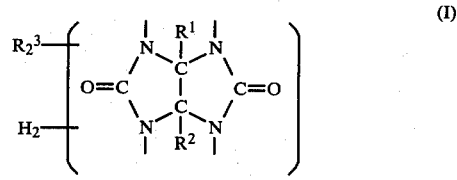

(I)

wherein $R^1$ and $R^2$ may be the same or different and independently of each other represent hydrogen, an aliphatic preferably $C_1$–$C_{20}$ or an aromatic preferably $C_6$–$C_{10}$ radical, and $R^3$ represents hydrogen, an aliphatic preferably $C_1$–$C_{20}$, a cycloaliphatic preferably $C_4$–$C_{15}$, an araliphatic preferably $C_7$–$C_{15}$ or an aromatic preferably $C_6$–$C_{15}$ radical.

The radicals $R^1$, $R^2$ and $R^3$ in the glycolurils of the general formula (I) may be completely or partly substituted with halogen (cl, Br) an $C_1-C_4$ alkoxy group, or hydroxy. However, $R^1$ preferably is not substituted, and preferably represents hydrogen, a $C_1-C_4$-alkyl or phenyl group, and most preferably represents hydrogen or a methyl group.

$R^3$ is preferably unsubstituted and represents hydrogen, an aliphatic $C_1-C_6$, a cycloaliphatic $C_5-C_6$, an araliphatic $C_7-C_{10}$ or an optionally $C_1-C_4$ alkylene-substituted phenyl radical. $R^3$ most preferably represents hydrogen.

The preparation of the glycolurils of the general formula (I) is known in the literature and may be carried out by reacting a dicarbonyl compound, for example, glyoxal and an optionally substituted urea, optionally in the presence of an acid catalyst like hydrochloric acid.

Salts of the following general formula (II) may preferably be used as reaction products of the glycolurils

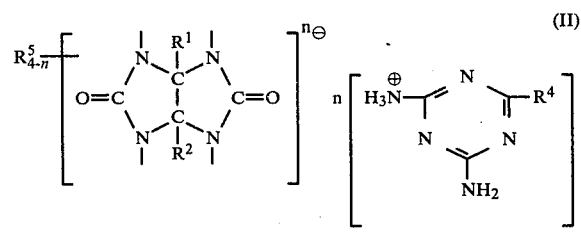

wherein $R^1$ and $R^2$ are as defined above, $R^4$ represents hydrogen, an amino group, or an optionally with a halogen atom (chlorine, bromine) substituted aliphatic $C_1-C_{20}$, preferably $C_1-C_6$, cycloaliphatic $C_4-C_{17}$, preferably $C_5-C_6$, araliphatic $C_7-C_{17}$, preferably $C_7-C_{10}$, or aromatic $C_6-C_{15}$, preferably $C_6-C_{10}$, radical, $R^5$ represents hydrogen, an aliphatic $C_1-C_{20}$, preferably $C_1-C_6$, cycloaliphatic $C_4-C_{15}$, preferably $C_5-C_6$, araliphatic $C_7-C_{15}$, preferably $C_7-C_{10}$, or aromatic $C_6-C_{15}$, preferably $C_6-C_{10}$, radical, and n represents an integer of from 1 to 4, preferably from 2 to 4.

$R^1$ and $R^2$ most preferably represents hydrogen or a methyl radical and $R^5$ most preferably represents hydrogen.

Glycoluril salts of glycoluril or dimethylglycoluril and melamine and/or 2-methyl- and/or 2-phenyl-4,6-diamino-1,3,5-triazine are particularly preferred. The glycoluril salts prepared from 1 mol of glycoluril and 2 mols or 4 mols of melamine, i.e. $R^4$ represents $NH_2$, are used as a particularly preferred salt of the general formula (II).

These glycoluril salts from glycolurils and the corresponding triazine derivatives are optionally prepared under elevated pressure at temperatures of from 20° to 130° C., preferably in suitable solvents and preferably in water.

Glycolurils or reaction products of the glycolurils are added to the polyamide resin in a quantity of from 0.1 to 20% by weight, preferably of from 0.5 to 15% by weight. When using glycolurils, a quantity of from 0.1 to 5% by weight, preferably from 0.5 to 3% by weight is sufficient for flame-proofing. However, the reaction products of the glycolurils are added to the polyamide resin in a quantity of from 0.1 to 20% by weight, preferably from 1 to 20, most preferably from 3 to 15% by weight. Of course, mixtures of glycolurils and the reaction products of glycolurils may also be used. It is also possible to add other flameproofing agents, for example, halogen compounds or red phosphorus, to the moulding composition.

The polyamide moulding compositions according to the present invention may contain up to 60% by weight of reinforcing materials and fillers. The following are used reinforcing materials and fillers: glass fibres, carbon fibres, asbestos fibres, glass beads, talcum, mica, wollastonite, microvit, chalk, silicon dioxide, graphite, gypsum and other conventional additives, such as pigments and dyes, e.g. cadmium sulphide, phthalocyanines and titanium dioxide.

Copper compounds or a mixture of a copper compound and an alkali metal halide may be added in quantities of from 0.001 to 1% by weight as additional flameproofing agents to the polyamide moulding compositions according to the present invention.

Suitable copper compounds include organic and inorganic copper salts. The following are mentioned as examples: copper(I)chloride, copper(II)sulphate, copper(I)iodide, copper(II)phosphate, copper(II)acetate, copper(II)stearate, copper(II)benzoate and copperchelate compounds. Suitable alkali metal halides include potassium iodide, potassium bromide, sodium chloride and sodium bromide.

Aromatic and/or higher aliphatic carboxylic acids and the alkali metal or alkaline-earth metal salts thereof, e.g. sodium stearate, calcium stearate, isophthalic acid and terephthalic acid, may be worked into the polyamide resin compositions according to the invention as aids and additives in quantities of from 0.1 to 1% by weight.

It is also possible to add any known antistatic agents such as conductive carbon black or quaternary ammonium salts.

The additives may be added to the polyamide resin according to the most varied known processes, preferably before moulding. The simplest process comprises admixing the additives dry with the polyamide resin. The dry-mixed material may then be melted and extruded for the production of granulates. The additives may also be admixed with the plasticised polyamide resin composition in the extruder using known metering apparatus. It is also possible initially to produce master-batch granulates by admixing large quantities of the additives with the polyamide resin and then to mix these master-batch granulates with the polyamide resin.

The mouldings may be produced by moulding the composition or the granulates using various moulding machines, in particular injection moulding machines, extruding machines, pressing machines or the like. The additives may also be worked in using the moulding machine.

Usually the additives are dosed to the polyamide at the processing temperature which is usually at least 10° C., but not more than 30° C., above the softening temperature of the polyamide. For example, in case of polyamide-6,6, the processing temperature is below 270° C., whereas in the case of polyamide-6, temperatures of below 250° C. are sufficient.

The polyamide resin compositions according to the present invention do not only exhibit an outstanding flame resistance, outstanding mechanical properties and an outstanding workability, but can be produced in light colours.

In the following Examples, the percentages are percent by weight and parts are parts by weight, unless otherwise indicated.

EXAMPLES

Preparation of Melamine Glycoluril (A) 7.1 kg of glycoluril are added to a mixture of 12.6 kg of melamine and 75 liters of water at 95° C. In order to complete the reaction, the mixture is stirred at 95° C. for 3 hours and is filtered off hot under suction, washed with water and dried at 100° C. in a circulating air drying chamber to a constant weight (yield 15.75 kg=80% of the theoretical yield). IR-spectrum and elemental analysis confirm the assumed structure.

$C_{10}H_{18}N_{16}O_2$ calculated: C=30.45% H=4.60%, N=56.83%. (394.4) found: C=30.4%, H=4.7%. N=56.9%.

3.55 kg of glycoluril are added under stirring at 95° C. to a mixture of 12.6 kg of melamine and 75 kg of water. In order to complete the reaction, the mixture is stirred for 3 hours with slight reflux. At 80° C., the resulting deposit is filtered under suction, washed with hot water and dried at 100° C. in a circulating air drying chamber to a constant weight. 13.1 kg of a salt of 1 mol of glycoluril and 4 mols of melamine are obtained, the structure of which is determined by IR-spectrum and elemental analysis.

$C_{16}H_{30}N_{28}O_2$ calculated: C=29.72%, H=4.68%, N=60.66%. (646.6) found: C=29.5%, H=4.7%, N=60.4%.

EXAMPLES 1 TO 3

The flameproofing agents according to the present invention were worked into the polyamides, optionally together with glass fibres, on a double shaft extruder Pt 55 manufactured by Reifenheuser, the shafts operating in opposite directions, under the conditions conventional for polyamides. The strand which is drawn off is cooled, granulated and dried. The granulated material is then injected on an injection moulding machine A 270 manufactured by Arburg to form test bodies according to ASTM of ¼, ⅛ and 1/16 inch and in the case of some samples of 1/32 inch.

These test samples are stored for 48 hours at 23° C. and at 50% relative air humidity and are then subjected to the "Vertical Burning Test for Classifying Materials" according to Underwriter's Laboratories (UL) Subject 94.

Furthermore, the test samples are stored for 7 days at 70° C. in a drying chamber, then cooled for 4 hours over silica gel, and are also tested according to UL subject 94.

In Table 1 the compositions of the test samples and the classification thereof according to UL Subject 94, are set forth, in order to demonstrate the improved fire-resistance.

No "flattening out" phenomena could be detected on any of the test samples during or after the injection moulding procedure, even over a longer period of time. All the test bodies retained their surface gloss after being stored for 7 days at 70° C. in the drying chamber.

TABLE

| Example | Polyamide | % by weight of Polyamide in the mixture | % by weight of flame-proofing agent | other additives | flame proofing test according to VL Subj. 94 | | | | | | | |
|---|---|---|---|---|---|---|---|---|---|---|---|---|
| | | | | | 48 h | | | | 7 days | | | |
| | | | | | ¼ | ⅛ | 1/16 | 1/32 | ¼ | ⅛ | 1/16 | 1/32 |
| 1 | PA 6 *η rel = 2.9 | 100 | — | — | V 2 | V 2 | V 2 | — | V 2 | V 2 | V 2 | V 2 |
| 2 | PA 6 | 90 | 10% A | — | V 0 | V 0 | V 0 | | V 0 | V 0 | V 0 | |
| 3 | PA 6 | 92.5 | 7.5% A | — | V 0 | V 0 | V 0 | | V 0 | V 0 | V 0 | |
| 4 | PA 6 | 99 | 1% A | — | V 0 | V 2 | V 2 | V 2 | V 0 | V 2 | V 2 | V 2 |
| 5 | PA 6 | 90 | 10% B | — | V 0 | V 0 | V 0 | V 0 | V 0 | V 0 | V 0 | V 0 |
| 6 | PA 6.6 *η rel = 3.0 | 100 | — | — | V 2 | V 2 | V 2 | | V 2 | V 2 | V 2 | |
| 7 | PA 6.6 | 95 | 5% A | — | V 0 | V 0 | V 0 | | V 0 | V 0 | V 0 | |
| 8 | PA 6 | 70 | — | 30% of glass fibres | b | b | b | | b | b | b | |
| 9 | PA 6 | 60 | 10% A | 30% of glass fibres | V 2 | V 2 | V 2 | | V 2 | V 2 | V 2 | |
| 10 | PA 6 | 60 | 10% B | 30% of glass fibres | V 2 | V 2 | V 2 | V 2 | V 2 | V 2 | V 2 | V 2 |

*relative viscosity measured on a solution of 1 g of polyamide in 100 ml of m-cresol at 25° C.
b = burns downs/resp. Sample burns to the holding clamp

We claim:

1. A self-extinguishing flame-resistant thermoplastic polyamide moulding composition which optionally contains up to 60% by weight, based on the total composition, of reinforcing material and/or filler and optionally other conventional aids or additives, and which contains from 0.1 to 20% by weight, based on the total composition, of at least one glycoluryl, a reaction product of a glycoluryl or a mixture thereof as flameproofing agent, said glycoluryl being of the formula

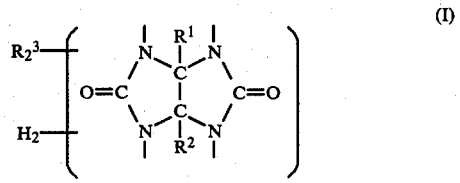

(I)

and said reaction product of glycoluryl being of the formula

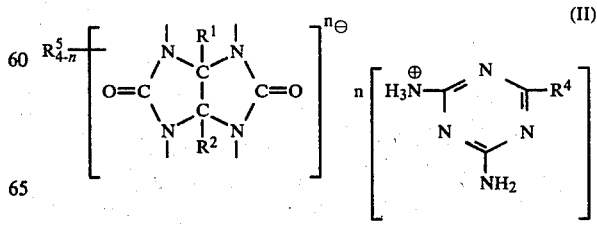

(II)

wherein $R^1$ and $R^2$ may be the same or different and each independently represents hydrogen or an aliphatic or aromatic radical;

$R^3$ represents hydrogen or an aliphatic, cycloaliphatic, araliphatic or aromatic radical;

$R^4$ represents hydrogen, amino, an aliphatic, cycloaliphatic, araliphatic or aromatic radical or one of said radicals substituted with halogen;

$R^5$ represents hydrogen or an aliphatic, cycloaliphatic, araliphatic or aromatic radical and n represents an integer of from 1 to 4.

2. A moulding composition as claimed in claim 1, wherein in formula (I) $R^1$ and $R^2$ represent hydrogen, an aliphatic $C_1$–$C_{20}$ or an aromatic $C_6$–$C_{10}$ radical, and $R^3$ represents hydrogen, an aliphatic $C_1$–$C_2$, a cycloaliphatic $C_4$–$C_{15}$, an araliphatic $C_7$–$C_{15}$ or an aromatic $C_6$–$C_{15}$ radical.

3. A moulding composition as claimed in claim 1, wherein in formula (II) $R^1$ and $R^2$ are as defined in claim 2, $R^4$ represents hydrogen, an amino group, an optionally with chlorine or bromine substituted aliphatic $C_1$–$C_{20}$, cycloaliphatic $C_4$–$C_{17}$, araliphatic $C_7$–$C_{17}$ or aromatic $C_6$–$C_{15}$ radical, $R^5$ represents hydrogen, an aliphatic $C_1$–$C_{20}$, cycloaliphatic $C_4$–$C_{15}$ araliphatic $C_7$–$C_{15}$ or aromatic $C_6$–$C_{15}$ radical and n represents 1 to 4.

4. A moulding composition as claimed in claim 1, wherein in formula (I) $R^1$ and $R^2$ represent hydrogen an aliphatic $C_1$–$C_4$ radical or a phenyl radical, and $R^3$ represents hydrogen, an aliphatic $C_1$–$C_6$, a cycloaliphatic $C_5$–$C_6$, an araliphatic $C_7$–$C_{10}$ or an optionally $C_1$–$C_4$ alkyl-substituted phenyl radical.

5. A moulding composition as claimed in claim 4, wherein $R^1$ and $R^2$ represent hydrogen or a methyl group and $R^3$ hydrogen.

6. A moulding composition as claimed in claim 1, wherein in formula (II) $R^1$ and $R^2$ are as defined in claim 4 and $R^4$ represents hydrogen, an amino group, an optionally with chlorine or bromine substituted aliphatic $C_1$–$C_6$, cycloaliphatic $C_5$–$C_6$, araliphatic $C_7$–$C_{10}$, or aromatic $C_6$–$C_{10}$ radical, $R^5$ represents hydrogen, an aliphatic $C_1$–$C_6$, cycloaliphatic $C_5$–$C_6$, araliphatic $C_7$–$C_{10}$, or aromatic radical and n represents an integer of from 2 to 4.

7. A moulding composition as claimed in claim 1, wherein in formula (II) $R^1$ and $R^2$ are as defined in claim 7 and $R^4$ is an amino group and $R^5$ represents hydrogen.

8. A moulding composition as claimed in claim 1, wherein 1 to 20% by weight of the flameproofing agent is used.

9. A moulding product produced from a moulding composition as claimed in claim 1.

* * * * *